United States Patent
Chang et al.

(10) Patent No.: US 6,921,045 B2
(45) Date of Patent: Jul. 26, 2005

(54) SUPERSONIC AIRCRAFT WITH CHANNEL RELIEF CONTROL

(75) Inventors: Ming Chang, Valencia, CA (US); Victor Meza, Saugus, CA (US); John M. Morgenstern, Lancaster, CA (US); Alan E. Arslan, Santa Clarita, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 0 days.

(21) Appl. No.: 10/696,796

(22) Filed: Oct. 30, 2003

(65) Prior Publication Data

US 2005/0103929 A1   May 19, 2005

(51) Int. Cl.$^7$ ................................................. B64C 5/02
(52) U.S. Cl. ......................... 244/15; 244/45 R; 244/87
(58) Field of Search ............................... 244/15, 45 R, 244/45 A, 75 R, 1 N, 87

(56) References Cited

U.S. PATENT DOCUMENTS

| | | | |
|---|---|---|---|
| 2,472,763 A * | 6/1949 | Rodeck ........................ 244/13 |
| 3,018,987 A * | 1/1962 | Multhopp ................. 244/75 R |
| 3,026,065 A * | 3/1962 | Holland, Jr. ................ 244/12.4 |
| 3,284,028 A * | 11/1966 | Robertson .................... 244/15 |
| 4,161,300 A | 7/1979 | Schwaerzler et al. |
| 4,290,612 A * | 9/1981 | Frosch et al. ................ 277/345 |
| 4,351,502 A | 9/1982 | Statkus |
| 4,427,168 A | 1/1984 | McKinney et al. |
| 4,445,655 A | 5/1984 | Hueberger |
| 4,485,992 A | 12/1984 | Rao |
| 4,848,700 A | 7/1989 | Lockheed |
| 4,913,380 A | 4/1990 | Vardaman et al. |
| 5,020,740 A | 6/1991 | Thomas |
| 5,482,228 A | 1/1996 | Hoshino |
| 5,681,013 A | 10/1997 | Rudolph |
| 5,692,703 A | 12/1997 | Murphy et al. |
| 5,927,656 A | 7/1999 | Hinkleman |
| 5,934,607 A | 8/1999 | Rising et al. |
| 6,015,117 A | 1/2000 | Broadbent |
| 6,273,364 B1 | 8/2001 | Tizac et al. |
| 6,279,853 B1 | 8/2001 | Brighton |
| 6,293,497 B1 | 9/2001 | Kelley-Wickemeyer et al. |
| 6,340,134 B1 | 1/2002 | Meschino |
| 6,390,417 B1 | 5/2002 | Yoshino |
| 6,481,668 B2 | 11/2002 | Grossman |
| 6,575,406 B2 * | 6/2003 | Nelson ........................ 244/119 |

* cited by examiner

*Primary Examiner*—Galen Barefoot
(74) *Attorney, Agent, or Firm*—Ken J. Koestner; Koestner Bertani LLP

(57) ABSTRACT

A supersonic aircraft comprises a fuselage extending forward and aft along a longitudinal axis, the fuselage having a lower surface and an upper surface, a highly swept low aspect ratio wing coupled to the fuselage and having a forward leading edge and an aft trailing edge, an effector flap coupled to the wing trailing edge, and a tail empennage. The tail empennage is coupled to the fuselage aft of the wing on the fuselage upper surface in a position high relative to the wing. The tail empennage forms a channel region subject to complex shock patterns at transonic conditions. The aircraft further comprises an effector coupled to the tail empennage and a controller coupled to the effector flaps and the effectors. The controller further comprises a control process that reduces drag through channel relief by deflecting both the effector flap down and the effector up.

7 Claims, 19 Drawing Sheets

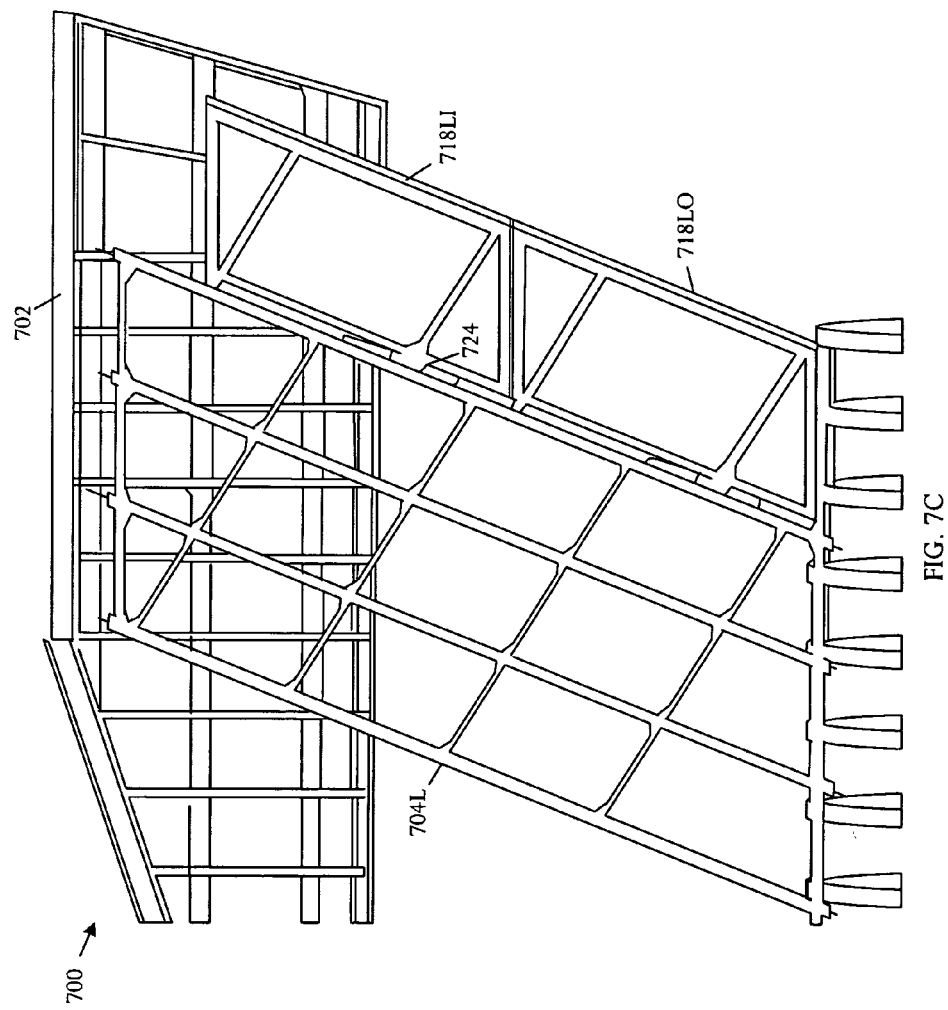

SUPERSONIC AIRCRAFT WITH CHANNEL RELIEF CONTROL

BACKGROUND OF THE INVENTION

The global economy makes long range business travel more essential than ever. However, other than Concorde, with presence declining as transatlantic flights have discontinued, the pace of business travel remains at 1960's-era speeds. Technology advances have produced longer range, safer, and more comfortable aircraft—but not faster flights.

Supersonic overland capability and range are drivers of market potential for aircraft in the commercial and business sector. Buyers of supersonic commercial aircraft are expected to be from entities such as corporations, governments and government agencies, and high net-worth individuals. Most operators are expected to be large organizations, for example corporations and governments, with sophisticated flight departments that can manage multiple aircraft types. Flights are expected to depart and arrive in a wide range of environments, from large international and national airports to small local airfields or suburban airports, with or without substantial service capabilities.

Although a supersonic aircraft for usage in commercial and business environments is to have many characteristics of a high-performance military aircraft, flight characteristics, operations, maintenance, and cost should be compatible to a business or commercial realm. The aircraft should be compatible with the infrastructure, servicing and operations experience base, and air traffic control system of the extant civil business jet.

The user community expects the aircraft to be usable not only in large, urban international hubs but also in suburban airports so that compatibility with shorter runway lengths, narrower taxiways, and lower maximum gross weight surfaces is desirable. Servicing and maintenance compatibility with personnel, equipment, and capabilities found at well-equipped fixed based operators (FBOs) and maintenance facilities is highly useful.

Many of the desirable features of supersonic civilian aircraft, particularly low-boom performance and long range, are very difficult to attain. Bill Sweetman in "Flights of fancy take shape—from Jane's (www.janes.com)", 21 Jul. 2000, discusses the United States Defense Advanced Research Projects Agency (DARPA) Quiet Supersonic Platform (QSP) program that is aimed at developing an efficient supersonic-cruise aircraft that does not produce a sonic boom. The difficulty of such a result is indicated by the agency's admission that only a revolutionary design will meet the goal, and that incremental application of new technologies, or integration of existing technologies, is expected to be insufficient to attain the reduced boom goal.

Extension of aircraft range involves balancing of fuel capacity, payload volume, fuel consumption at desired speeds, aerodynamic, and other factors. Reduction of aerodynamic drag can assist in extending range, reducing sonic boom, and improving aircraft performance.

For most supersonic and transonic aircraft, wave drag is a major component of total drag so that wave drag reduction is an objective of many design methodologies. Some aircraft have empennages that encompass control surfaces that are sufficiently close to form a channel, forming complex shock patterns which often manifest as extra drag and tend to appear in operation beyond a particular Mach number. The shock patterns can choke the channel at transonic conditions. In an aerodynamic analysis, a drag rise curve becomes more peaked, forming a transonic thrust pinch point, in the presence of channel choking. In an aerodynamic analysis, the presence of channel choking may cause the transonic drag rise curve to become more peaked, thus forming a transonic pinch point as depicted in FIG. 8.

SUMMARY OF THE INVENTION

What is desired is a relief mechanism that can clear the transonic pinch point and reduce or eliminate channel choking.

In accordance with some embodiments, a supersonic aircraft comprises a fuselage extending forward and aft along a longitudinal axis, the fuselage having a lower surface and an upper surface, a highly swept low aspect ratio wing coupled to the fuselage and having a forward leading edge and an aft trailing edge, an effector flap coupled to the wing trailing edge, and a tail empennage. The tail empennage is coupled to the fuselage aft of the wing on the fuselage upper surface in a position high relative to the wing. The tail empennage forms a channel region subject to complex shock patterns for transonic flight conditions. The aircraft further comprises an effector coupled to the tail empennage and a controller coupled to the effector flaps and the effectors. The controller further comprises a control process that reduces drag through channel relief by deflecting both the effector flap down and the effector up. In a particular embodiment, the tail can be an inverted V-tail, and the controller deflects a trailing edge flap on the wing down while deflecting a ruddervator on an inverted stabilizer upward.

In accordance with other embodiments, a supersonic aircraft comprises an aircraft body extending forward and aft, a highly swept low aspect ratio wing coupled to the body and having a forward leading edge and an aft trailing edge, an effector flap coupled to the trailing edge of the wing, and an inverted V-tail. The inverted V-tail is coupled at the aft portion of the aircraft body and coupled to the wing in a braced wing configuration. The inverted V-tail forms a channel region that can generate complex shock patterns. The aircraft further comprises ruddervator control surfaces coupled to the inverted V-tail and a controller. The controller is coupled to the effector flap and the ruddervator control surfaces. The controller comprises a control process that reduces drag through channel relief by deflecting both the effector flap down and the ruddervator control surfaces up.

In further embodiments, a channel control system is used in a supersonic aircraft including a fuselage, wings, a tail empennage, and a plurality of control effectors coupled to the wings and the tail empennage. The empennage and wings form a channel region that can form complex shock patterns at transonic speeds. The channel control system comprises a plurality of actuators coupled to the control effectors. The effectors include a flap coupled to the wing and an effector coupled to the tail empennage. The channel control system further comprises at least one vehicle management computer coupled to the plurality of actuators. The vehicle management computers further comprise a process for managing the control effectors in a drag reduction mode through channel relief by deflecting both the flap downward and the tail empennage effector upward.

BRIEF DESCRIPTION OF THE DRAWINGS

Embodiments of the invention relating to both structure and method of operation, may best be understood by referring to the following description and accompanying drawings.

FIGS. 7A, 7B, and 7C, three schematic perspective pictorial views show detailed diagrams of portions of the tail structure.

DETAILED DESCRIPTION OF THE EMBODIMENTS

Figure 1A:
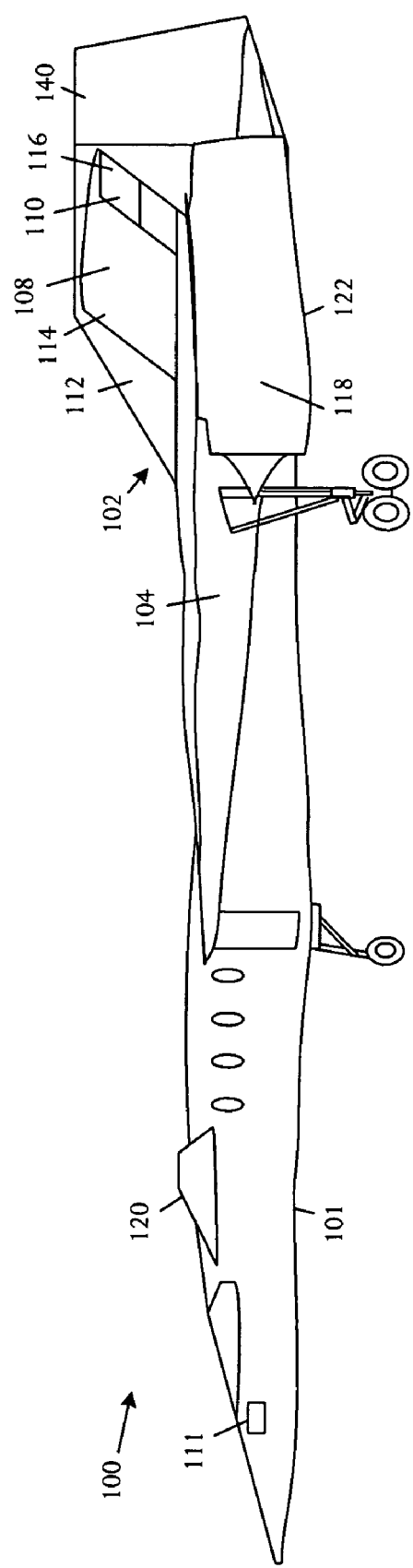
FIGS. 1A, 1B, and 1C are schematic pictorial diagrams respectively showing side, front, and top views of an embodiment of a supersonic aircraft capable of reducing drag through channel relief.
Figure 1B:
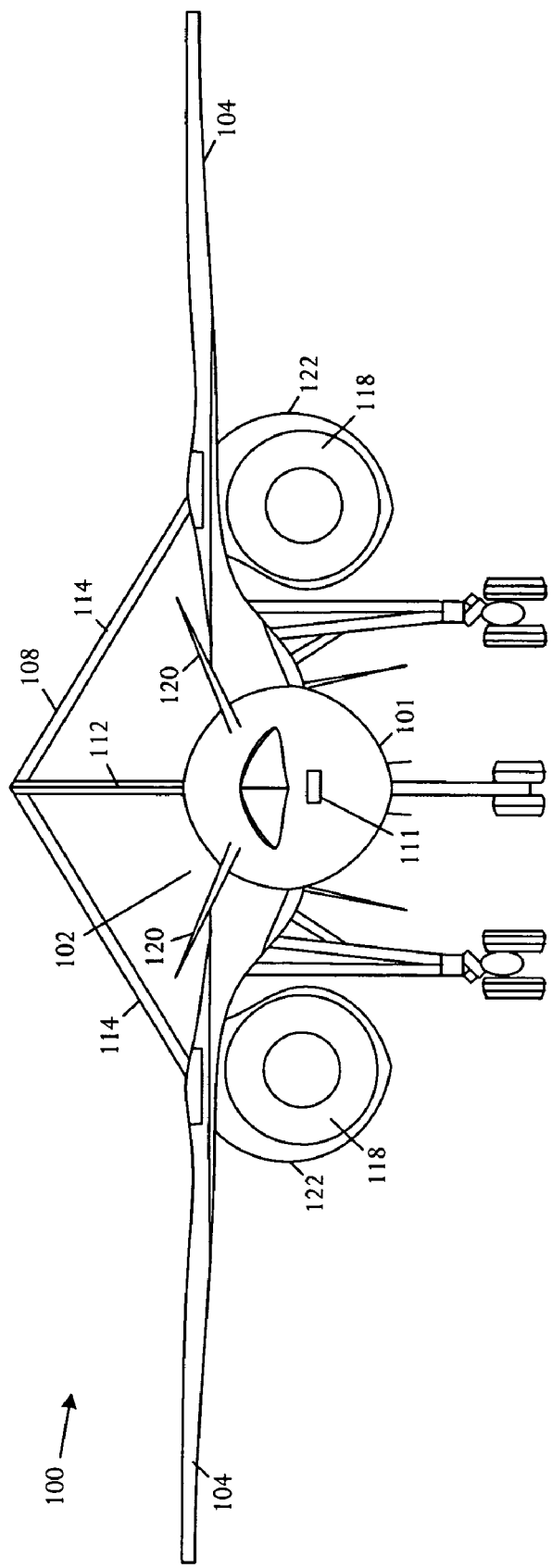
Figure 1C:
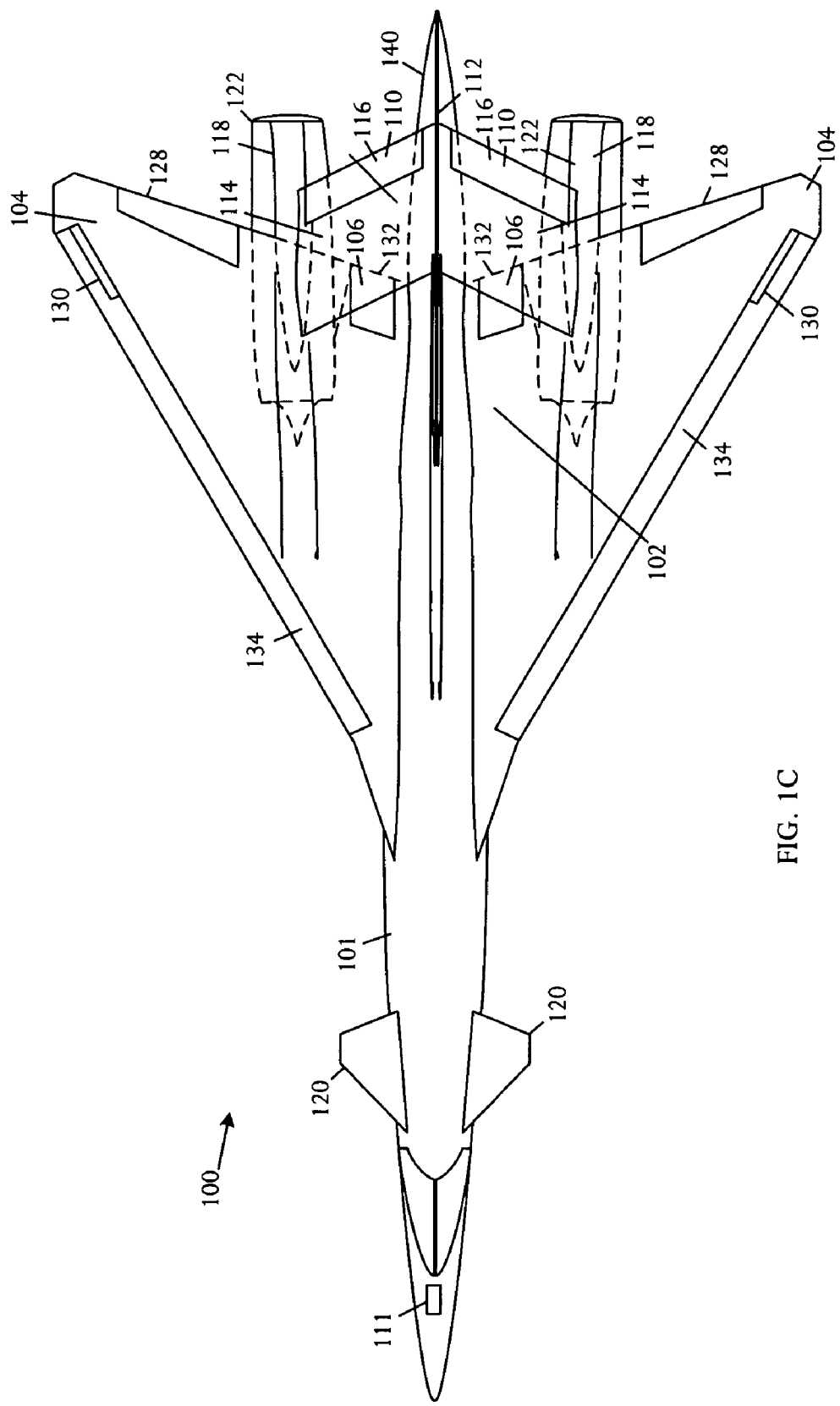

Referring to FIGS. 1A, 1B, and 1C, schematic pictorial diagrams respectively showing side, front, and top views of an embodiment of a supersonic aircraft 100. The supersonic aircraft 100 comprises a fuselage 101 extending forward and aft along a longitudinal axis, a highly swept low aspect ratio wing 104 coupled to the fuselage 101 with an effector flap 106 coupled to the wing trailing edge, and a tail empennage 108. The tail empennage 108 is coupled to the fuselage 101 aft of the wing 104 on the fuselage upper surface in a high position relative to the wing 104. The tail empennage 108 and wing 104 form a channel region 102 that is subject to complex shock patterns. The aircraft further comprises an effector 110 coupled to the tail empennage 108 and a controller 111 communicatively coupled to the effector flap 106 and the effector 110. The controller 111 implements a control process that reduces drag through channel relief by deflecting both the effector flap 106 down and the effector 110 up.

In some configurations, the controller 111 may also deflect other effectors, such as ailerons, while deflecting the effector flap 106 and the effector 110 to counter any resulting pitching moment. In other embodiments, examples of effectors 110 may include leading edge or trailing edge surfaces of the wing 104. Similarly, examples of effector flaps 106 can include a leading edge device for the horizontal tail or the entire slat of the tail.

In the illustrative aircraft 100 the tail empennage 108 has an inverted V-tail geometry coupled to the wing 104 in a braced wing configuration. The V-tail 108 further connects to a vertical stabilizer 112, lateral inverted stabilizers 114, and inverted V-tail control surface ruddervators 116 capable of adjusting the aircraft longitudinal lift distribution throughout the flight envelope to maintain a low-boom, low-drag trim condition.

In some embodiments, the controller 111 implements a control process that increases drag by choking the channel, deflecting both the effector flap 106 up and the effector 110 down. In the deployment for increased drag, the control effectors can operate as a speedbrake, for example for usage in emergency descents.

The aircraft embodiment 100 further comprises engines 118 coupled to the aft portion of the wing lower surface with the inverted V-tail geometry empennage 108 coupled to the wing in the braced wing configuration carrying lift at the aft portion of the aircraft 100 on a high mounted tail 108. The length of the aircraft is effectively extended for shock waves below the aircraft 100, thereby further reducing sonic boom. The inverted V-tail 108 carries tail lift high to maintain a continuous lift distribution and structurally bracing the wing 104 and engines 118.

Referring to FIG. 1C, control effectors are shown for the supersonic aircraft 100. Two sets of surfaces are available for pitch control including canards 120 and ruddervators 116. Roll control uses ailerons 128 and high speed spoilers 130. Yaw control is supplied by a rudder 140, ruddervators 116, and differential canard 120.

In combination with the canards 120, the supersonic aircraft 100 has multiple stability and control effectors. The canard 120 and symmetric defections of the ruddervators 116 control pitch power. A vertical rudder 140 controls yaw. Inboard, midboard and outboard ailerons 128, and the high speed roll spoilers 130 control roll. The segmented ailerons 128 provide both roll control power and automatic wing camber control to optimize lift and drag throughout the flight envelope. The roll spoilers 130 are configured to control roll at supersonic Mach numbers. High-speed spoilers 130 supplement aileron roll power at transonic and supersonic speeds where Mach number and aeroelastic effects reduce aileron effectiveness.

Some embodiments of an aircraft may include, in combination with the canards 120, a leading edge device to be used in conjunction with an outboard trailing edge flap deflection, which can be a more effective roll device from both drag and aeroelastic perspectives.

In an illustrative embodiment, trailing edge (TE) flaps 132 are effectors 106 than can be deployed 30° down to generate additional lift during landing. TE flap deployment reduces angle-of-attack specifications by approximately 2° during landing. During second-segment climb, the TE flaps 132 are extended 10° to improve the lift-to-drag ratio for better climb performance.

Leading edge (LE) Krueger flaps 134 are extended 130° for low speed operations including takeoff, approach and landing. The LE Krueger flaps 134 improve lift-to-drag ratio by 1.5, resulting in better climb performance that facilitates second-segment climb in case of engine malfunction.

In some embodiments, the aircraft 100 can be configured with a high lift system that includes simple inboard trailing edge flaps 132 and full-span leading edge Krueger flaps 134.

The multiple control surfaces of the supersonic aircraft 100, for example the ruddervators 116 inboard and outboard design, enable continued operation and landing following single actuator failure or a single control surface jamming. Differential canard deflection can generate a yawing moment to counter a jammed rudder. Ailerons 128 and ruddervators 116 include multiple surfaces, increasing fault tolerant capability and supplying redundant elements for improved reliability.

Referring again to FIGS. 1A, 1B, and 1C, in the illustrative aircraft 100, shaping of the wing 104, body 101, empennage 108, and the integration of the propulsion system 116 are configured to produce a shaped sonic signature and control supersonic cruise drag. An inverted V-tail geometry 108 facilitates the overall low-boom design and supports nacelles 122 in an appropriate position relative to the wing 104, as well as enabling for trim to attain a low sonic-boom lift distribution. Inverted V-tail control surfaces, called ruddervators 116, adjust the aircraft longitudinal lift distribution throughout the flight envelope to maintain a low-boom, low-drag trim condition. The canard 120 supplies additional trim control and augments longitudinal control power.

In various embodiments, the illustrative aircraft 100 may include one or more of several advancements including addition of an all-flying canard 120, an optimized wing 104, incorporation of leading edge flaps 134 and spoilers 130, and a reconfigured body or fuselage 101. The canard 120 improves takeoff rotation and high-speed control. Wing planform and airfoil shapes are configured to assist high-speed performance, low-speed performance, low sonic boom, stability and control, and structural mass fraction characteristics. Sizes of the inverted V-tail 108 and fins can be configured to improve both structural and aerodynamic integration, benefiting both weight and drag characteristics. Flaps 134 improve takeoff performance. Spoilers 130 assist high-speed roll control.

The illustrative aircraft 100 has a twin-engine, slender-body configuration with a highly swept low aspect ratio wing 104, a configuration highly appropriate for low-boom performance based on volume-based sonic boom ruling. Equivalent area minimization can be used to reduce sonic boom signature. When equivalent area due to geometric area and lift sum to the minimized distribution, a minimized ground sonic boom occurs. The aft engine location beneath the wing 104, in combination with a highly integrated wing/inlet geometry, produces both low-boom compatibility and low inlet/nacelle installation drag. The inverted V-tail geometry 108 supplies both a low sonic-boom performance while generating longitudinal trim in cruise, and structural support for the engine/nacelle installation.

Some embodiments of the aircraft 100 implement one or more of several features including a multi-spar wing 104, a fuselage structure 101 with stringer-stiffened skins supported by frames, canards 120 that are integrated with the pressurized fuselage cabin structure, and aft-located engines 116 supported by a torque-box structure that extends aft of the wing 104 and is attached to the inverted V-tails 108.

Figure 2A:
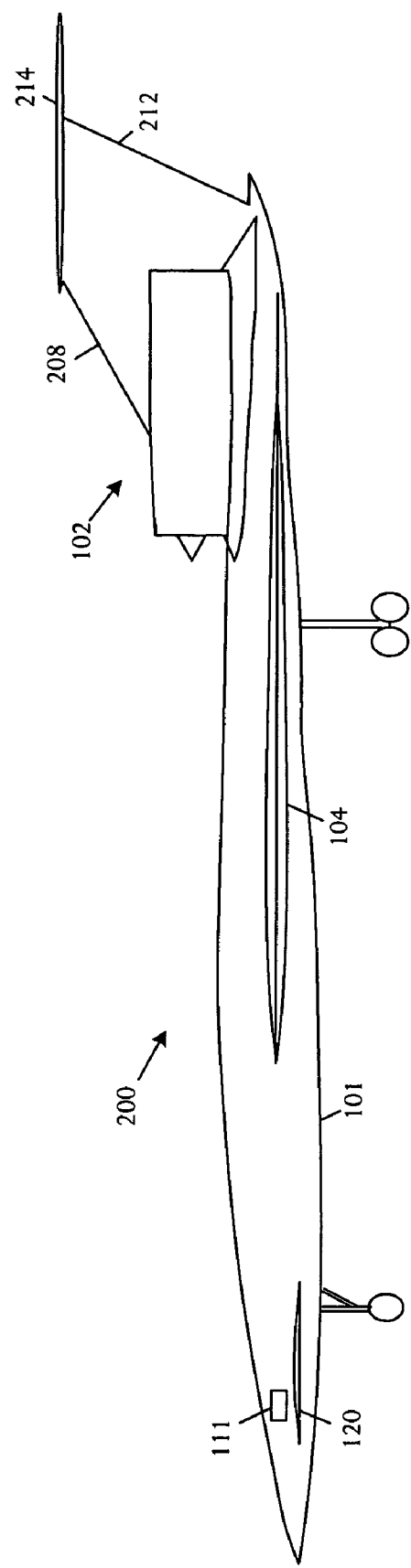
FIGS. 2A, 2B, and 2C are schematic pictorial diagrams respectively showing side, front, and top views of another embodiment of a supersonic aircraft that has a T-tail geometry.
Figure 2B:
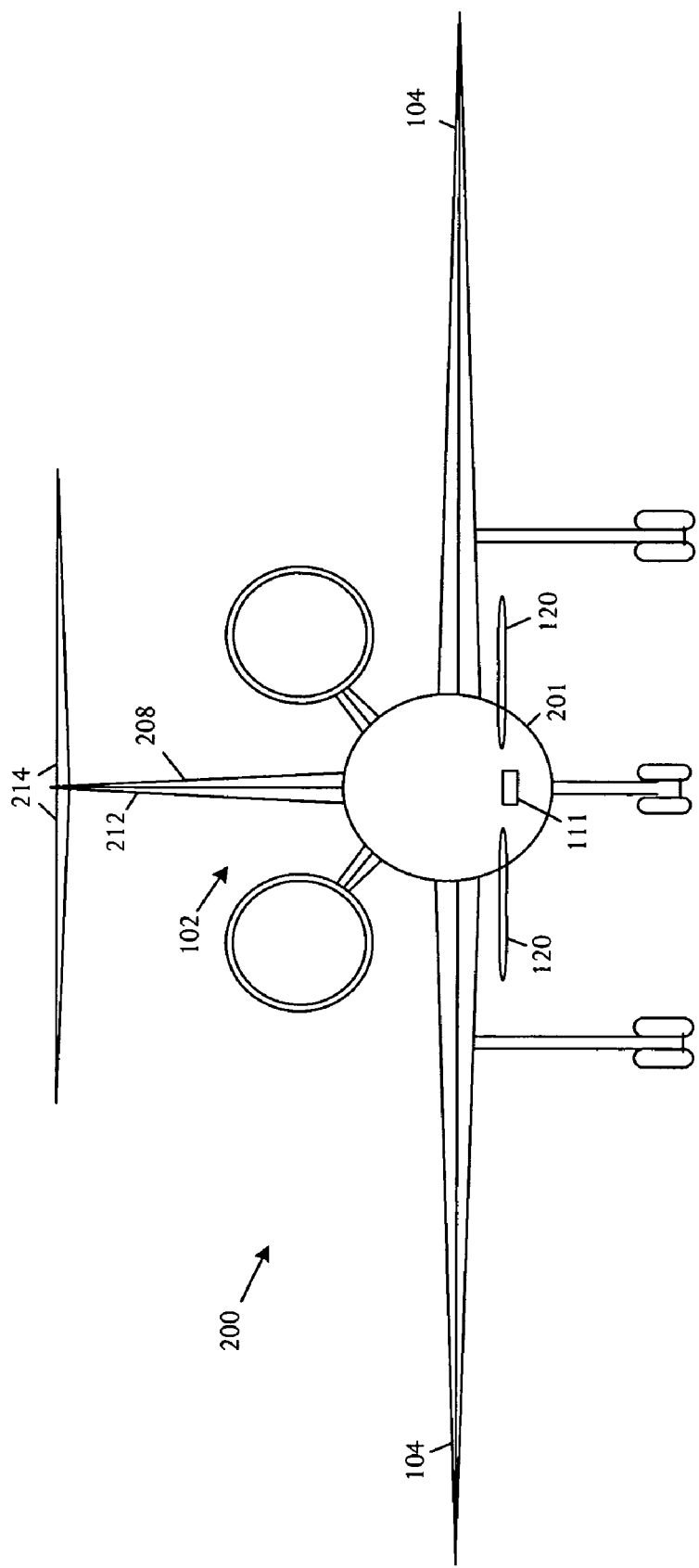
Figure 2C:
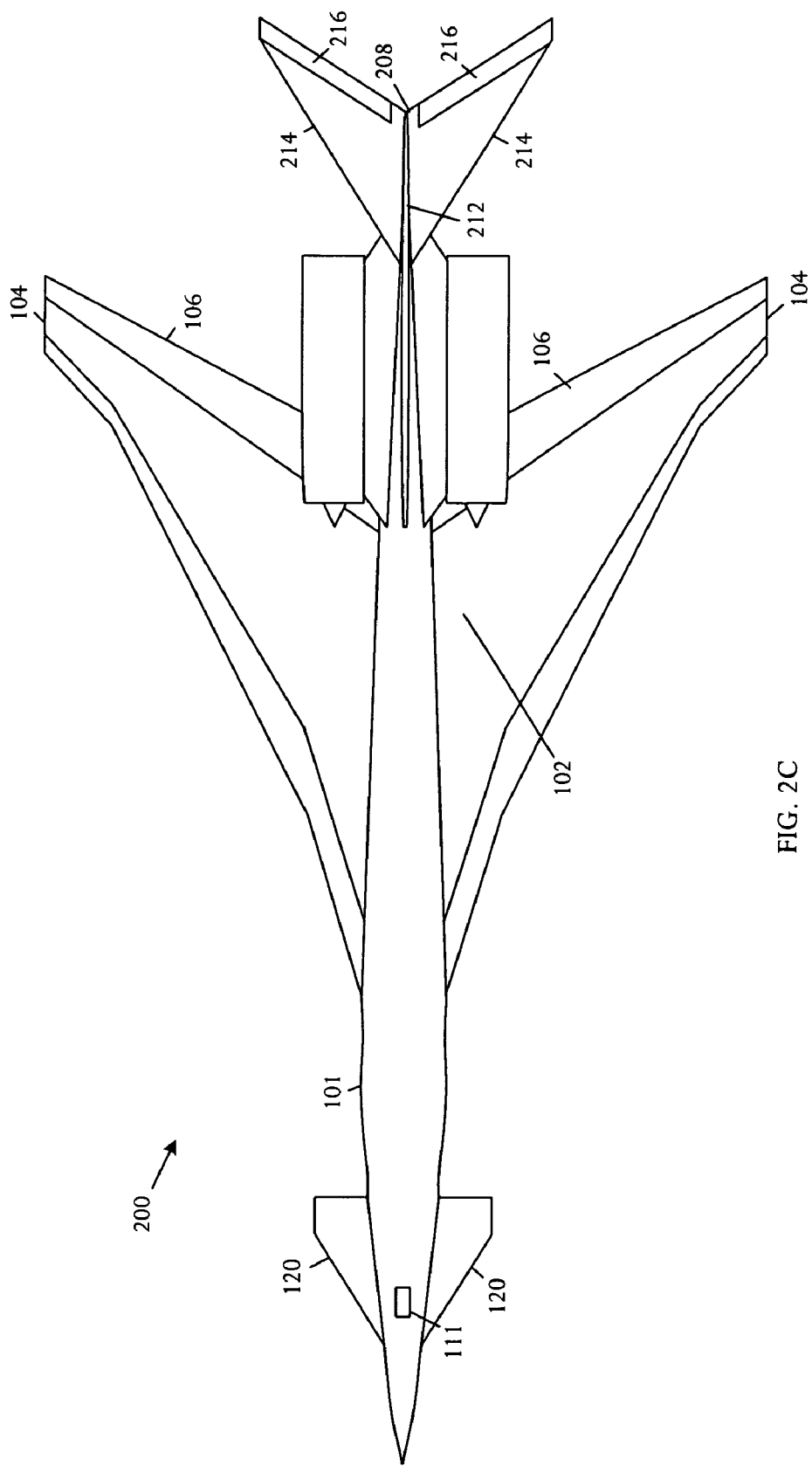

Referring to FIGS. 2A, 2B, and 2C, schematic pictorial diagrams respectively showing side, front, and top views of another embodiment of a supersonic aircraft 200 with a T-tail geometry 208. The aircraft 200 tail empennage has a supersonic T-tail geometry 208 that includes a vertical stabilizer 212, a lateral horizontal stabilizer 214, and a control surface elevator 216 capable of adjusting the aircraft longitudinal lift distribution throughout the flight envelope to maintain a low-boom and/or low-drag trim condition. The horizontal stabilizer 214 is the entire horizontal tail, an all-moving tail.

Figure 3A:
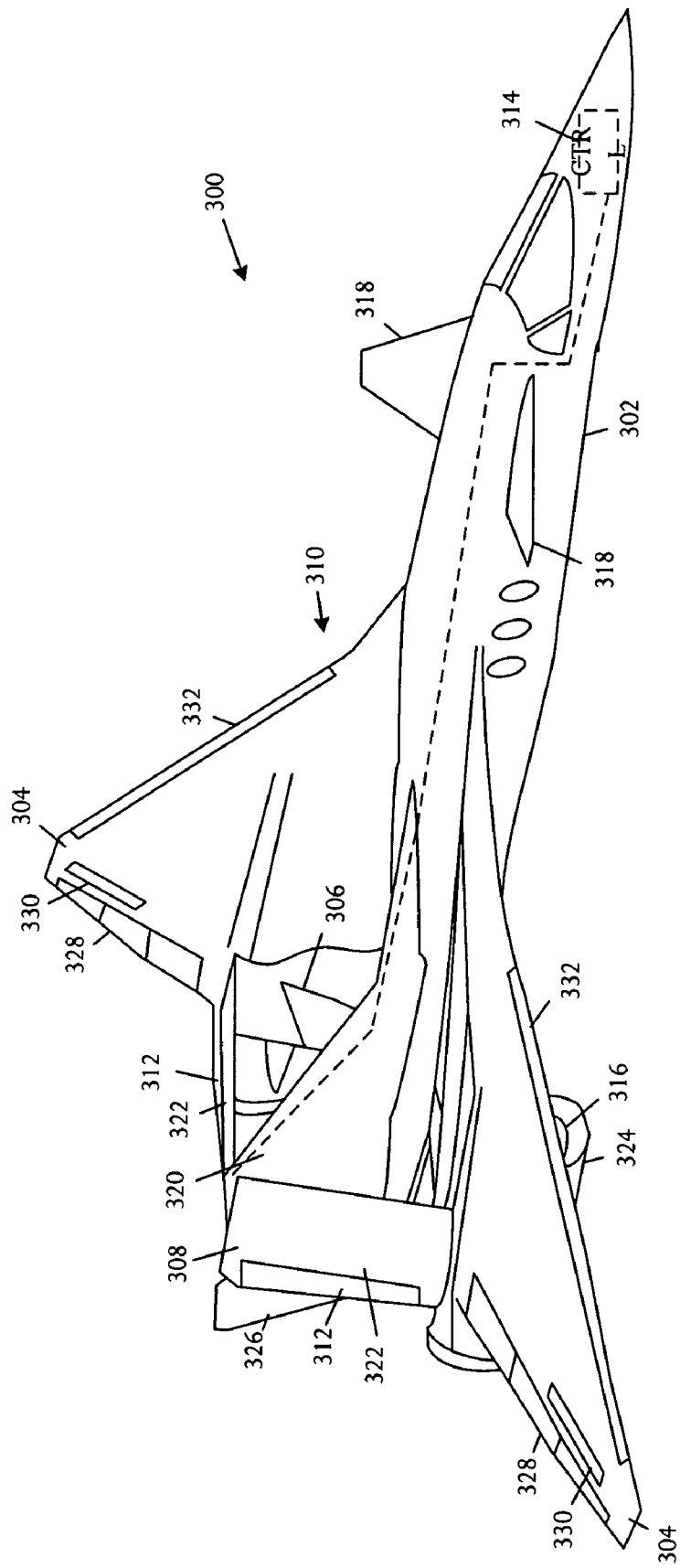
FIGS. 3A and 3B are schematic pictorial diagrams illustrating side and bottom perspective views of another embodiment of a supersonic aircraft in a configuration that enables channel relief.
Figure 3B:
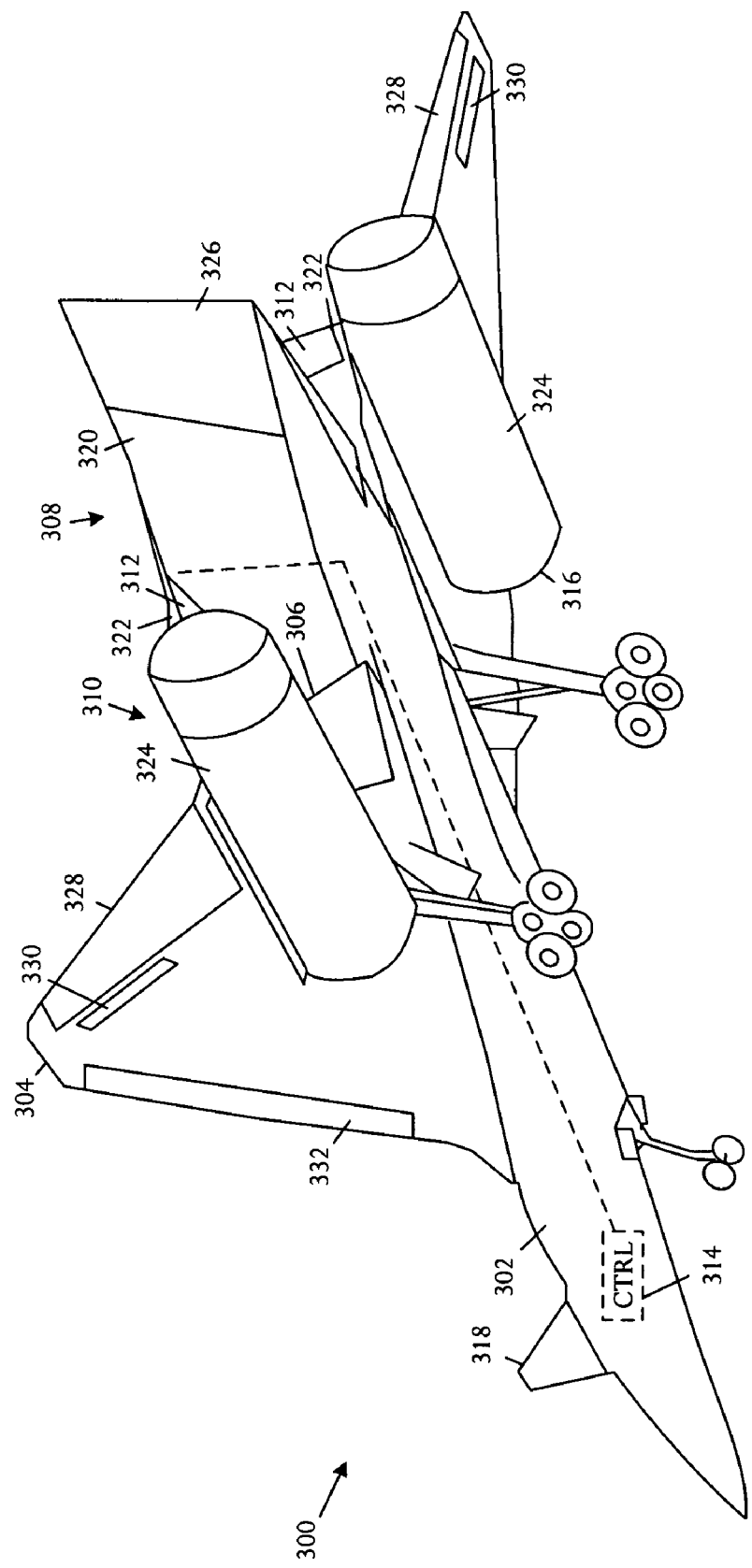

Referring to FIGS. 3A and 3B, schematic pictorial diagrams show side and bottom perspective views of an embodiment of a supersonic aircraft 300. The supersonic aircraft 300 comprises an aircraft body 302 extending forward and aft, a highly swept low aspect ratio wing 304 coupled to the body 302 and having a forward leading edge and an aft trailing edge. An effector flap 306 is coupled to the trailing edge of the wing 304. The aircraft has an inverted V-tail 308. The inverted V-tail 308 is coupled at the aft portion of the aircraft body 302 and coupled to the wing 304 in a braced wing configuration. The inverted V-tail 308 forms a channel region 310 that can generate complex shock patterns. The aircraft 300 further comprises a ruddervator control surfaces 312 coupled to the inverted V-tail 308 and a controller 314. The controller 314 is coupled to the effector flap 306 and the ruddervator control surfaces 312.

The controller 314 implements a control process that reduces drag through channel relief by deflecting both the effector flap 306 down and the ruddervator control surfaces up 312. In some embodiments, the controller 314 can also implement a control process that increases drag by choking the channel 310, deflecting both the effector flap 306 up and the effector 312 down. The control process that increases drag can be used, for example, for operation as a speedbrake.

The controller 314 implements a control process that adjusts aircraft longitudinal lift distribution throughout a flight envelope to maintain a low sonic boom, low drag-trim condition.

The illustrative aircraft 300 has two wing-mounted engines 316 positioned beneath the wing 304 at an aft location. The braced wing V-tail 308 supports the engines 316 and enables trim for a low sonic boom lift distribution. In some embodiments, the engines 316 have a highly integrated wing/inlet geometry that enables low-boom compatibility and low inlet/nacelle installation drag. In some embodiments, the body 302 has a slender body configuration that equalizes area forward and aft and facilitates sonic boom reduction. A canard 318 coupled to the body 302 supplies additional trim and augments longitudinal control power.

Other embodiments may utilize a different tail configuration, for example a T-tail or other forms. The illustrative inverted V-tail 308 has a central vertical stabilizer 320, inverted stabilizers 322 coupled to sides of the central vertical stabilizer 320 and also coupled to the fuselage 302. The inverted stabilizers 322 and assist the fuselage 302 in supporting engine nacelles 324. The inverted V-tail 308 also includes ruddervators 312 that are pivotally coupled to the inverted stabilizers 322 and can have operations managed by the controller 314. Generally, the controller 314 controls the ruddervators 312 to move up and down together for longitudinal control.

The ruddervators 312 can be configured with sufficient torsional stiffness to reduce or minimize flutter resulting from ruddervator rotation coupling with V-tail bending and torsion. Ruddervators 312 have appropriate actuator stiffness and ruddervator torsional stiffness, along with a V-tail mass distribution controlled using ballast weight to manage ruddervator rotation coupling with V-tail bending and torsion. The ruddervators 312 can be symmetrically deflected in combination with the canards to supply pitch control power. The vertical rudder 326 supplies yaw control with roll control supplied by inboard, outboard, and midboard ailerons, and high speed roll spoilers.

The controller 314 also manages other control effectors in combination with the canards 304 and the ruddervators 312, including leading edge Krueger flaps 332, trailing edge flaps 306, ailerons 328, and spoilers 330.

Figure 4:
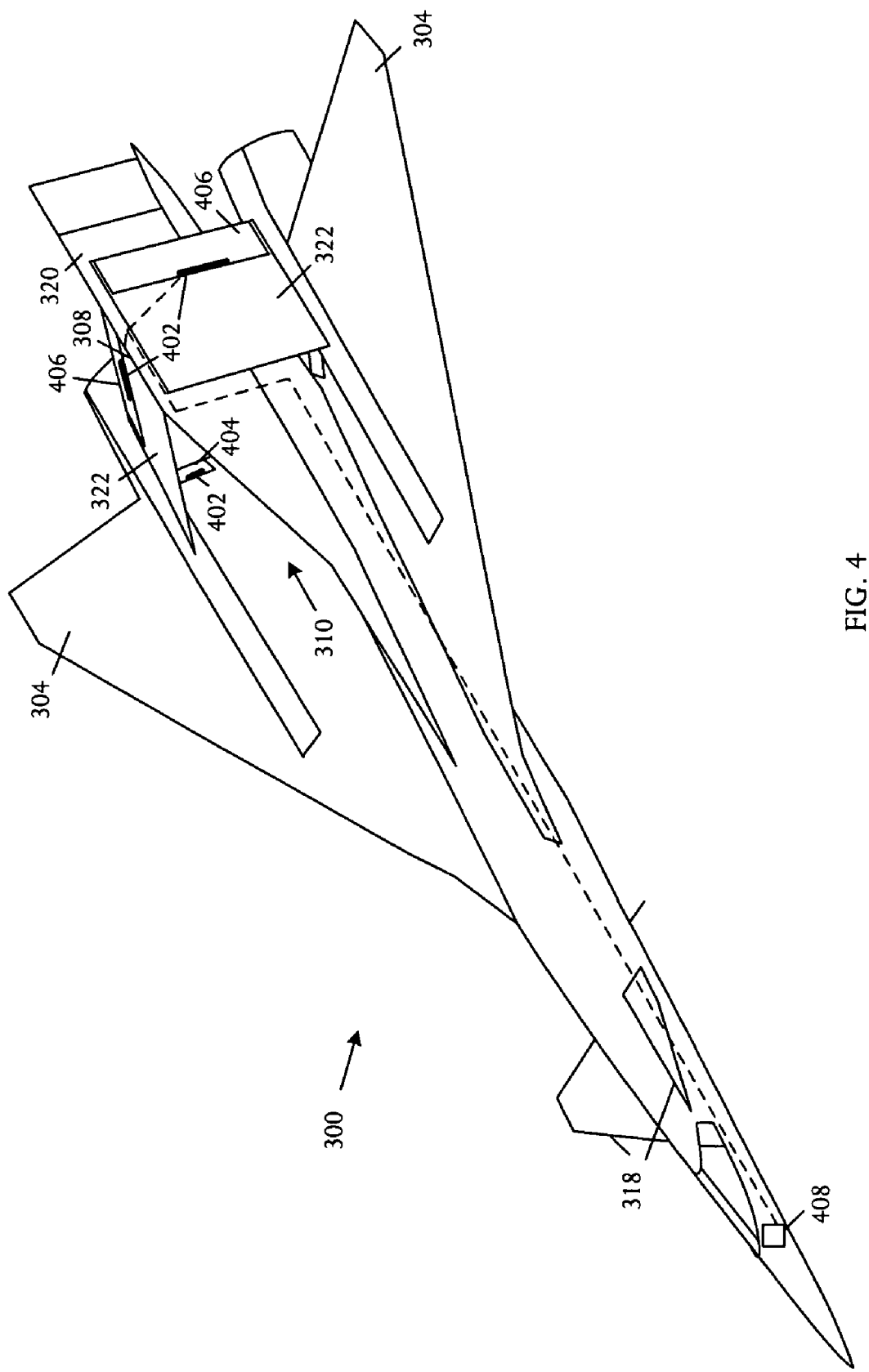
FIG. 4 is a schematic pictorial diagram illustrating an embodiment of a channel control system that can be used in a supersonic aircraft.

Referring to FIG. 4 in combination with FIGS. 3A and 3B, a schematic pictorial diagram illustrates an embodiment of a channel control system 400 is used in the supersonic aircraft 300 that includes a fuselage 302, wings 304, a tail empennage 308, and a plurality of control effectors coupled to the wings 304 and the tail empennage 308. The empennage 308 and wings 304 form a channel region 310 that can form complex shock patterns at transonic speeds. The channel control system 400 comprises a plurality of actuators 402 coupled to the control effectors. The effectors include a flap 404 coupled to the wing 304 and an effector 406 coupled to the tail empennage 308. The channel control system 400 further comprises at least one vehicle management computer 408 coupled to the plurality of actuators. The vehicle management computers implement a process for managing the control effectors in a drag reduction mode through channel relief by deflecting both the flap 404 downward and the tail empennage effector 406 upward. In some embodiments, the vehicle management computers also manage the control effectors in a speedbrake mode that increases drag by choking the channel and deflecting the flap 404 upward and the tail empennage effector 406 downward.

In the illustrative embodiment, the wing 304 is a highly swept low aspect ratio wing with the effector flap 404 mounted on the trailing edge of the wing. The tail empennage 308 is in a configuration of an inverted V-tail coupled at the aft portion of the aircraft body 302 and coupled to the wing 304 in a braced wing configuration. The tail empennage effector 406 is a ruddervator that is coupled to an inverted stabilizer in the inverted V-tail 308.

The illustrative aircraft 300 further includes a differential canard 318 that is mounted on the body 302. The canard 318 has an actuator 302 communicatively coupled to a vehicle management computer that can deflect the canard 318 in combination with the control effectors to facilitate drag reduction and drag augmentation for usage as a speed brake.

Figure 5A:
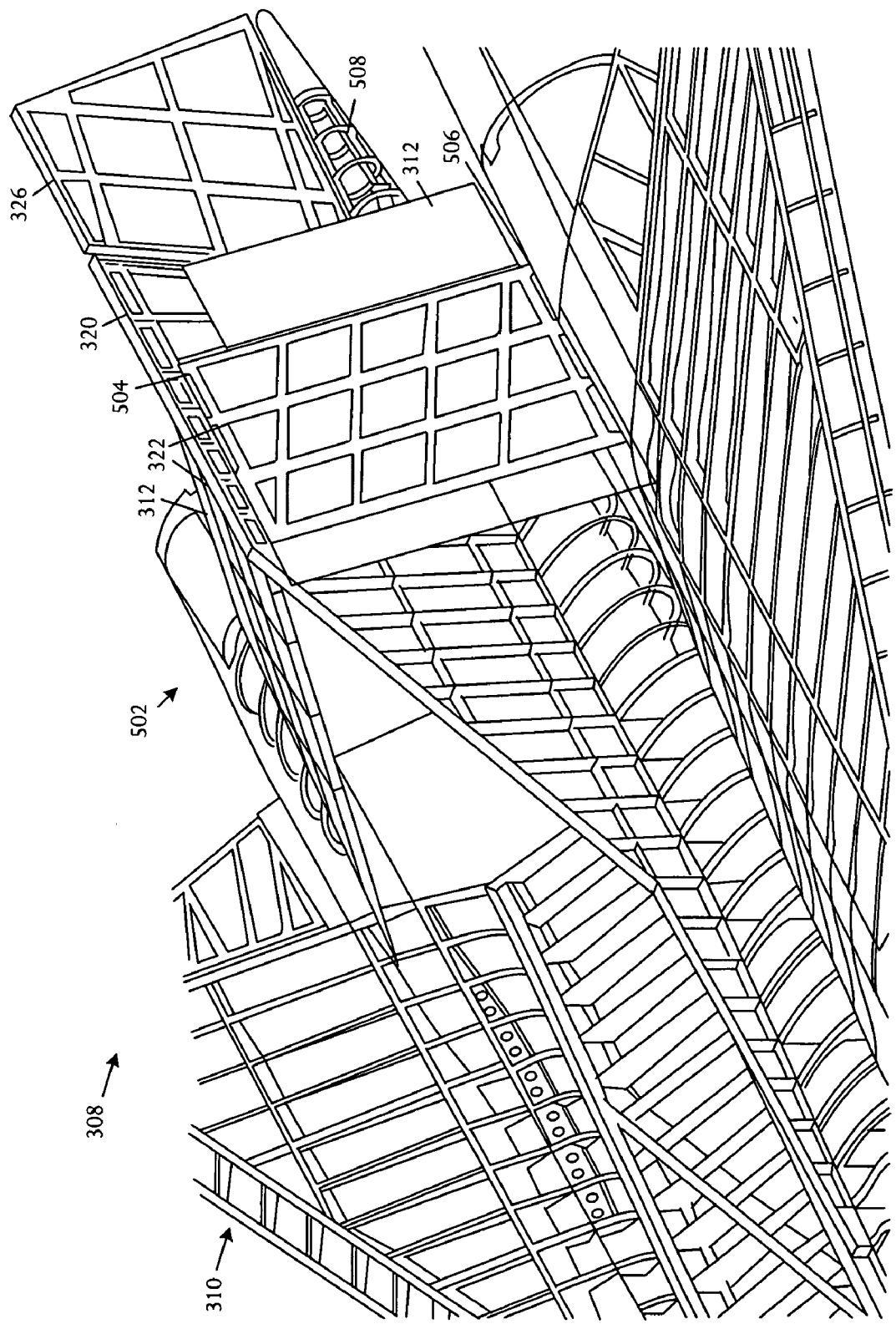
FIGS. 5A and 5B are two schematic pictorial diagrams illustrating the channel region within the wing and empennage in more detail.
Figure 5B:
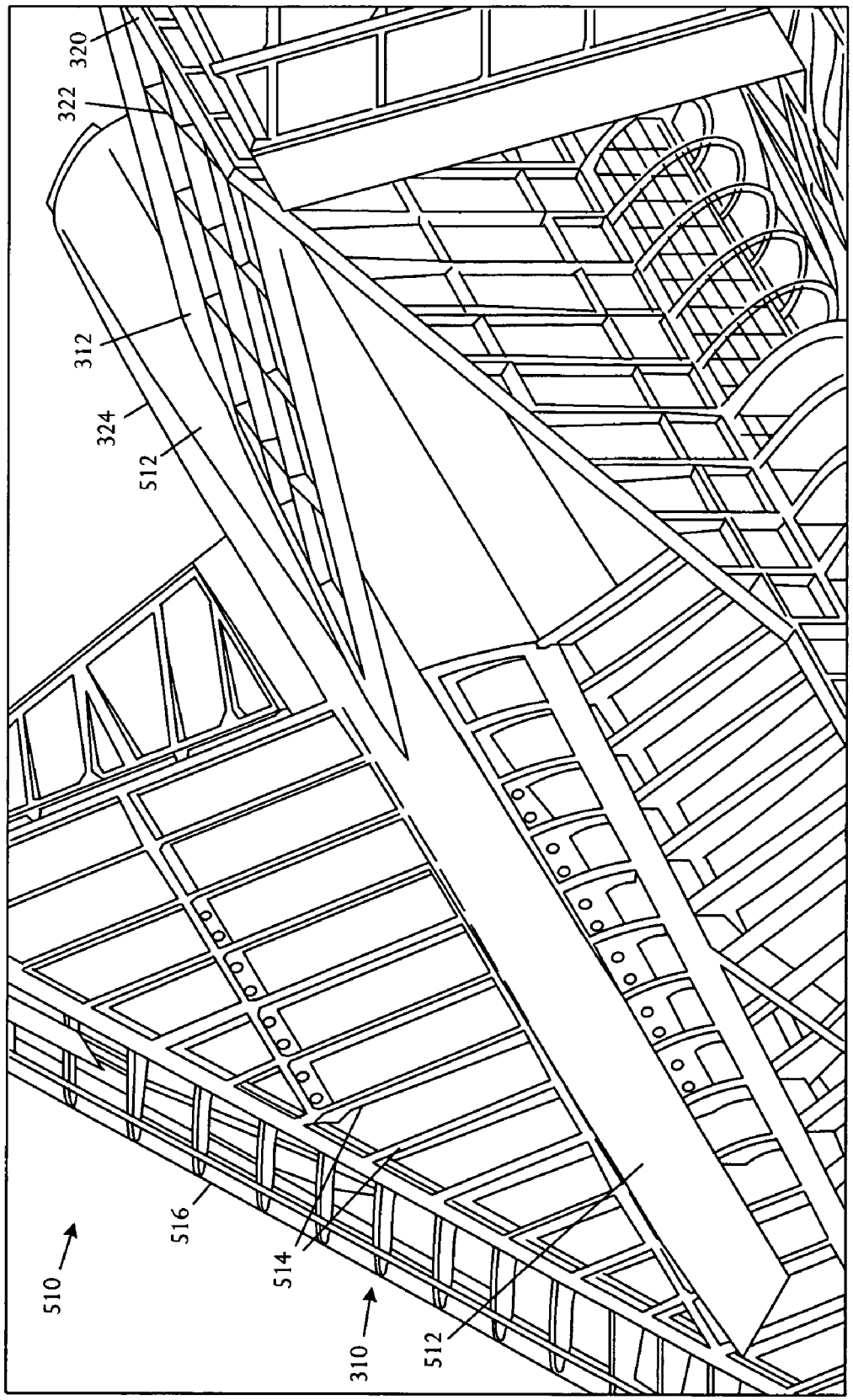

Referring to FIGS. 5A and 5B, two schematic pictorial diagrams illustrate the channel region 310 within the wing 304 and empennage 308 in more detail. The empennage 308 includes a tail structure section 502, a vertical stabilizer to inverted stabilizer joint section 504, and an inverted stabilizer to nacelle joint section 506. The tail structure section 502 includes the vertical stabilizer 320, and a pair of inverted stabilizers 322. Control effectors include the rudder 326 pivotally connected to the trailing edge of the vertical stabilizer 320 and ruddervators 312 pivotally connected to the trailing edge of the inverted stabilizers 322.

The vertical stabilizer 320 is attached to the top of the aircraft center body and aft section 508. The top of the vertical stabilizer 320 is attached to the tops of the left and right inverted stabilizers 322.

FIG. 5B shows a view of a right nacelle structure 510 including the right engine nacelle 324, a right structural support member 512, such as a torque box or torsion box, and wing spars 514 within the right wing 516. The right nacelle structure 418 is attached to the right wing section 516 and the lower right inverted stabilizer 410.

The wing 516 includes multiple support spars or ribs 514 within an airfoil that supports the airfoil structural support members 512 on the right and left sides of the aircraft. The airfoil structural support members 512 have a configuration that reduces body freedom flutter by increasing chordwise wing bending by engine rib enhancement.

Figure 6A:
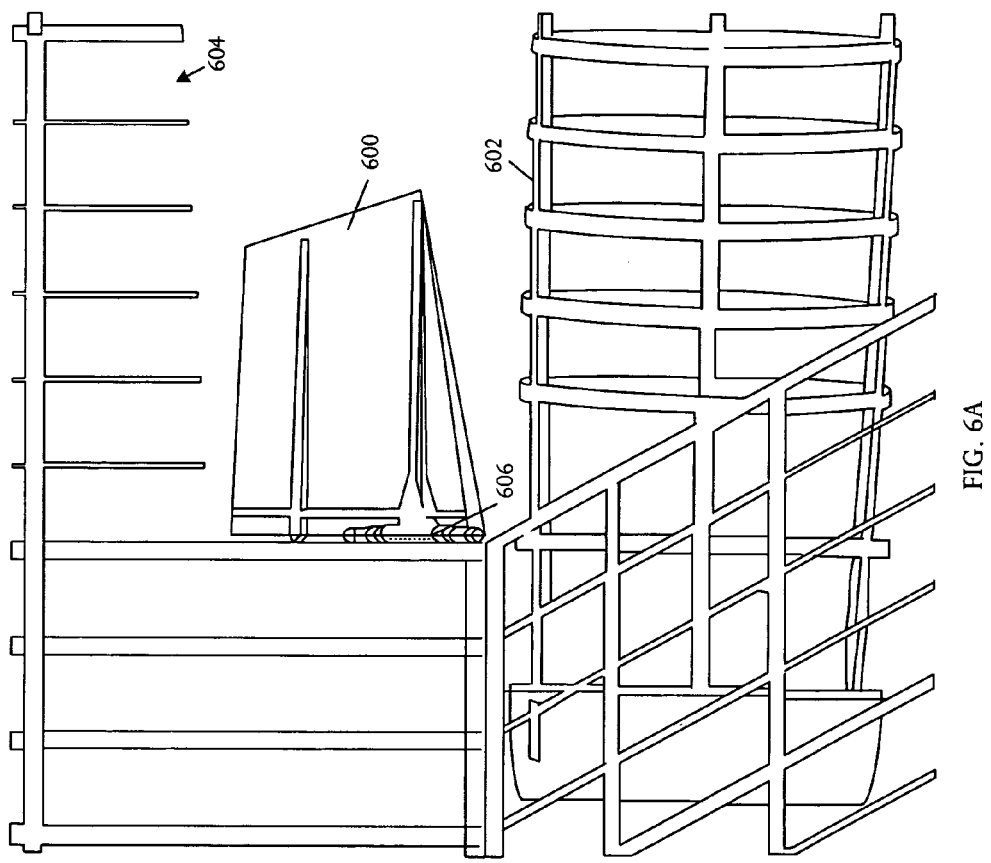
FIGS. 6A and 6B are two pictorial diagrams depicting different views of a trailing edge flap that can be used in an embodiment of an aircraft capable of channel relief control.
Figure 6B:
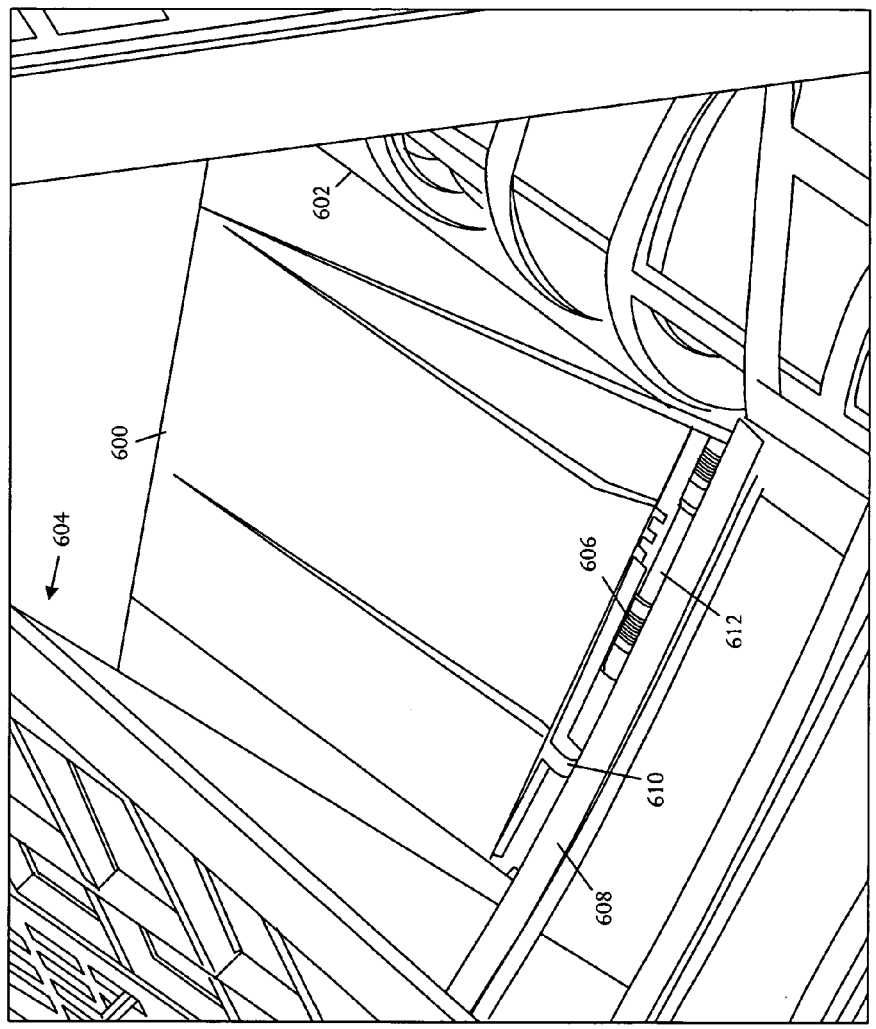

Referring to FIGS. 6A and 6B, two pictorial diagrams illustrate different views of a trailing edge flap 600 that can be used in an embodiment of an aircraft capable of channel relief control. The trailing edge flap 600 is located between the engine nacelle 602 and the fuselage 604. The trailing edge flap surface can rotate in a downward direction in combination with an upward deflection of the ruddervator in a controlled angle to reduce drag. In an illustrative embodiment, the flap surface can rotate down to a maximum predetermined angle, for example 20°. The engine nacelle 602 has sufficient clearance for the flap 600 to deflect to a maximum deflection angle.

An actuator 606 drives deflection of the trailing edge flap 600. In an illustrative embodiment, the actuator 606 is an electro-mechanical rotary actuator with integral motors, brakes, and a speed sensor.

FIG. 6B shows the trailing edge flap 600 attached at the inboard wing rear spar 608. The trailing edge flap 600 is pivotally connected to the wing rear spar 608 via a flap hinge 610 and an actuator hinge 612.

Figure 7A:
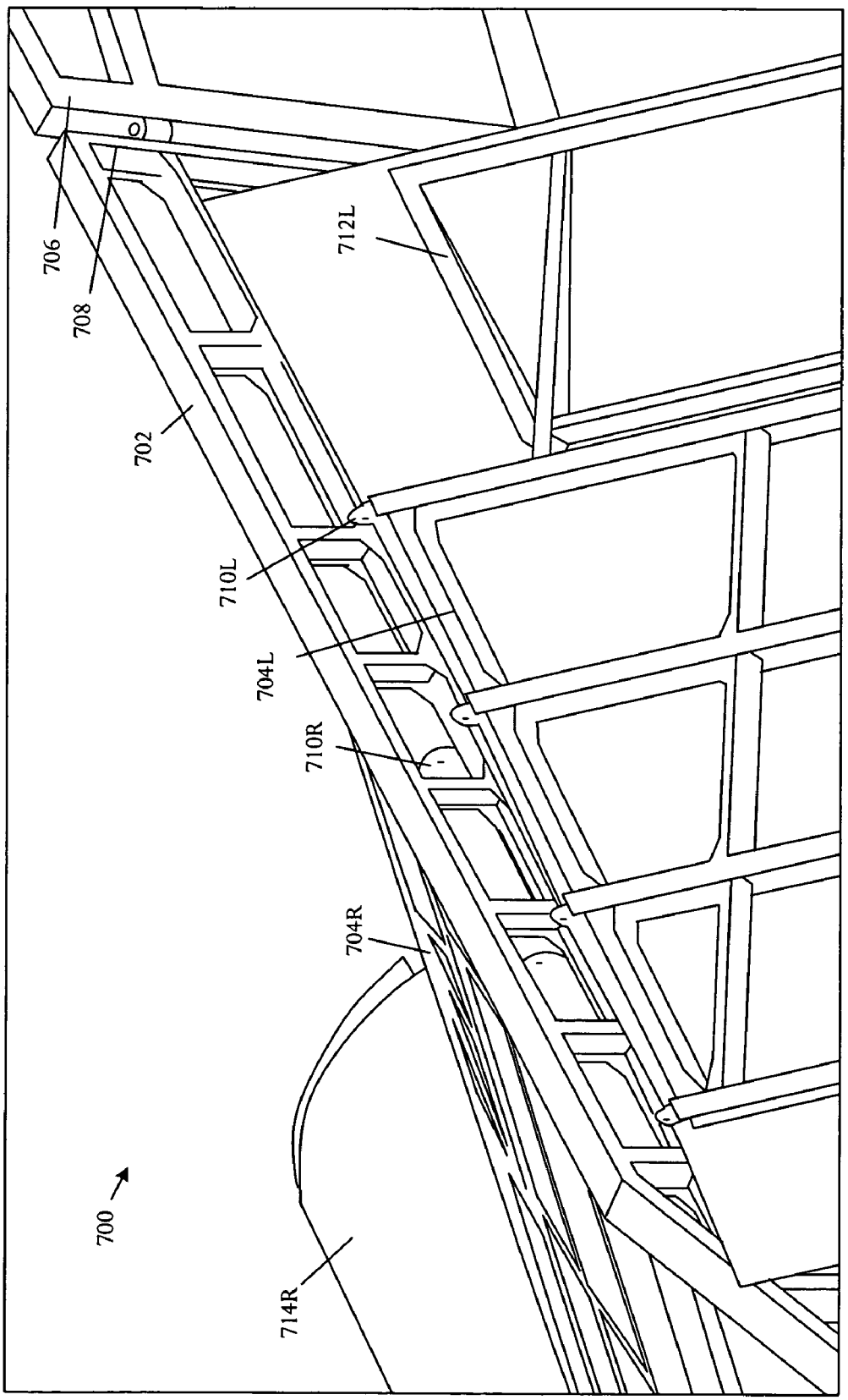
Figure 7B:
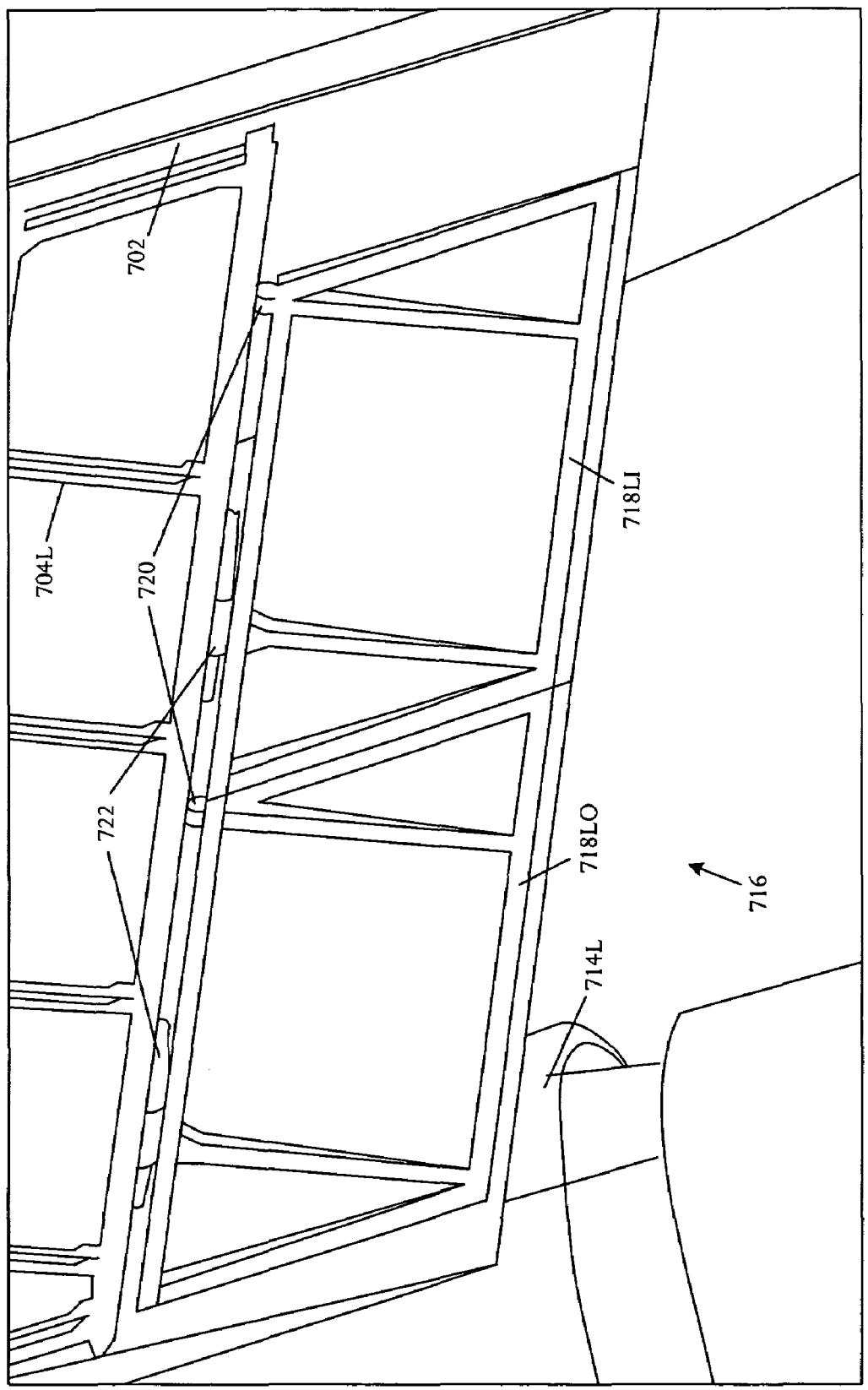

Referring to FIGS. 7A, 7B, and 7C, three schematic perspective pictorial views show detailed diagrams of portions of the tail structure 700. FIG. 7A depicts a view of the interface between a vertical stabilizer 702 and inverted stabilizers 704L, R. The top of the right 704R and left 704L inverted stabilizers are attached to the top of the vertical stabilizer 702. A rudder 706 is attached to the aft end 708 of the vertical stabilizer 702. The illustrative inverted stabilizers 704L, R couple to the vertical stabilizer 702 using left 710L and right 710R stabilizer upper lugs. Also shown in a left ruddervator surface 712L pivotally coupled to the left inverted stabilizer 704L.

The right inverted stabilizer 704R attaches to the wing adjacent to the right nacelle 714R.

FIG. 7B shows a ruddervator section 716 including the left inverted stabilizer 704L coupling between the vertical stabilizer 702 and the left wing adjacent to the left nacelle 714L. The illustrative configuration includes two ruddervators on each side, each of which is coupled to the inverted stabilizer. In the depicted view, a left outboard ruddervator 718LO and a left inboard ruddervator 718LI are shown coupled to the left inverted stabilizer 704L using ruddervator hinges 720 and actuator hinges 722 that control movement of the ruddervators.

FIG. 7C illustrates baseline actuators 724 for the ruddervators 718. In the illustrative embodiment, the actuators 724 are electro-mechanical rotary-type actuators. When integrated into the inverted V-tail, the rotary actuators 724 do not protrude into the airstream and thereby avoid increases in aerodynamic drag. The illustrative baseline actuators 724 have integral motor drivers, brakes, and a speed sensor. Also in an illustrative embodiment, the ruddervator surface rotates approximately ±35° about the hinge line. An aircraft can include multiple ruddervators 718 on each side, a redundancy that is useful to maintain aircraft control in a jammed-surface condition. The ruddervators 718 in FIG. 7B include redundant inboard and outboard sections.

Figure 8:
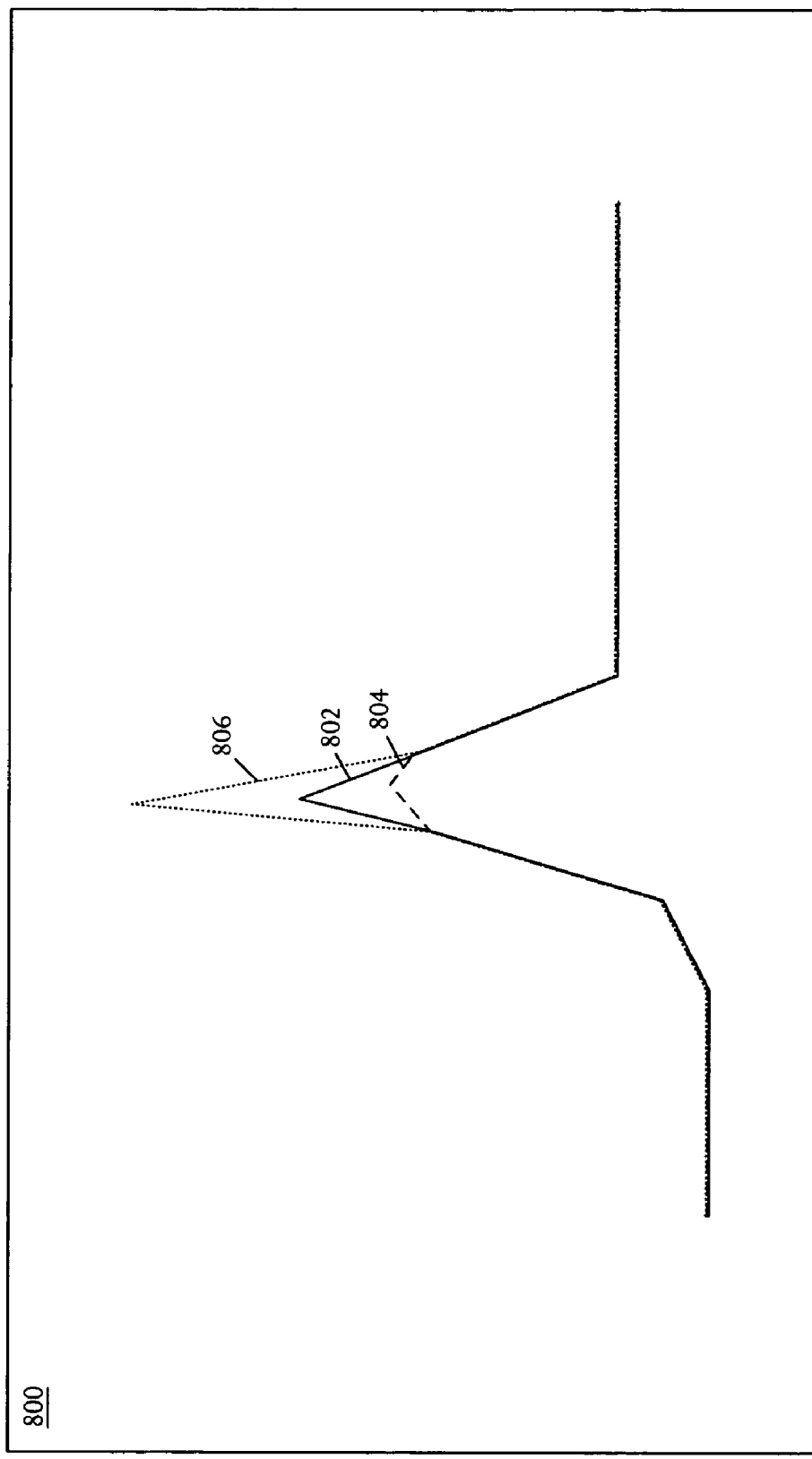
FIG. 8 is a graph illustrating a drag rise plot indicative of pressure drag in a supersonic/transonic aircraft.

Referring to FIG. 8, a graph illustrates a drag rise plot 800 indicative of pressure drag in a supersonic/transonic aircraft. The plot 800 shows the relationship of pressure drag to Mach number as the aircraft flies at different speeds. A baseline 802 shows drag rise performance for a supersonic aircraft embodiment without effector flap and effector deflection. Below supersonic speeds, pressure drag gradually rises with Mach number. At transonic Mach levels, the baseline drag rise plot 802 peaks, rapidly rising then falling at supersonic speeds. At high Mach numbers, the baseline pressure drag levels. With channel relief 804, an effector flap is deflected down while the effector is deflected up, relieving the channel and reducing the pressure drag at the transonic levels. During speed brake application 806, the effector flap and effector are deflected in opposite directions in comparison to channel relief deployment, choking the channel and creating a larger pressure drag peak in the transonic region.

In the subsonic and supersonic regions, the baseline 802, the channel relief line 804, and the speed brake line 806 are approximately the same.

Figure 9:
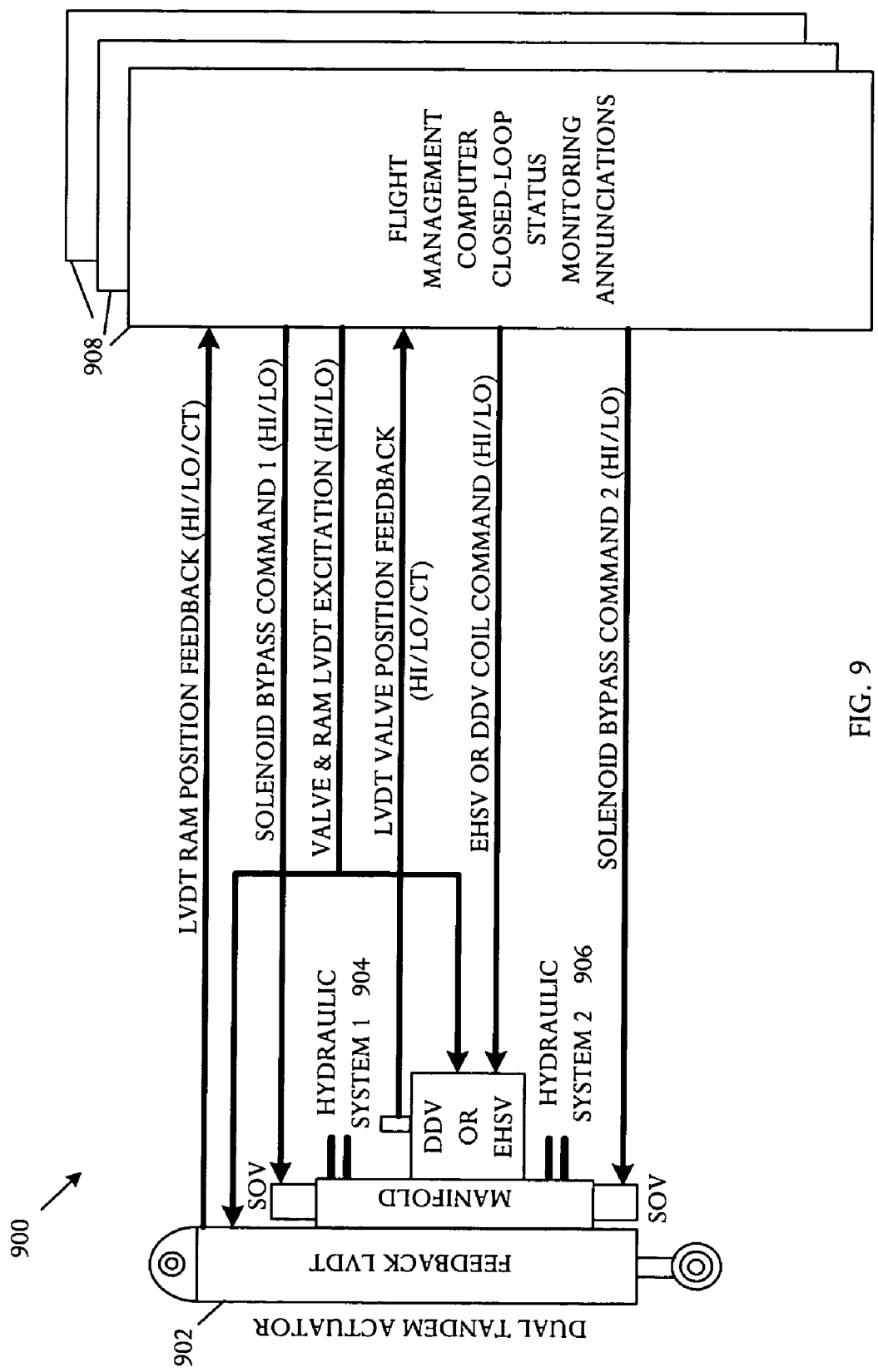
FIG. 9 is a schematic block diagram showing an example a flight control actuation architecture embodiment that can be used as the controller.

Referring to FIG. 9, a schematic block diagram shows an example a flight control actuation architecture embodiment 900 that can be used to control effectors in the empennage to operate in a drag reduction mode and, conversely, to increase drag in operation as a speedbrake. In the illustrative example, primary flight control actuation uses "Fly-by-Wire" dual tandem linear hydraulics with triple electronic redundancy. Dual tandem actuation 902 is powered by two independent hydraulic systems 904 and 906 and sized for full rated performance based on a single system operation. The flight control system is closed-loop and commanded by the Vehicle Management Computers 908. The flight control system 900 performs control law implementations to produce aircraft handling qualities throughout flight. The system 900 can implement outer loop control modes such as Autopilot, Autolanding, and Auto collision avoidance control. The flight control actuation system 900 can also execute system integrity and health management functions. Various types of actuators can be implemented including, for example, Dual Tandem hydraulic actuators, Simplex hydraulic actuators, Rotary vane hydraulic actuators, multiple cylinders hydraulic actuators, integrated rotary electro-mechanical actuators (IREMA), and the like.

The control effector configuration, controlled by the Vehicle Management Computers 908, uses redundant control surfaces, enabling continued safe flight and landing in event of a single actuator failure or mechanically-jammed control surface. Redundancy is extended to the ailerons and ruddervators, which are also designed into multiple surfaces for increased fault tolerance and improved overall safety.

The Vehicle Management Computers 908 implement processes for controlling the effectors, including the canards to distribute lift to reduce or minimize sonic signature and to drive the aircraft to relaxed stability. In an illustrative embodiment, two electronic flight control systems are used to give superior handling qualities and optimal performance throughout the flight envelope. The first system is a full-authority Fly-By-Wire system designed for stability and handling qualities and determining the basic dynamic response of the aircraft.

The second flight control system is an active center-of-gravity (CG) management system. As fuel is burned throughout the mission, the CG management system redistributes the remaining fuel to maximize range and reduce or minimize sonic boom signature. The CG management system also enables the canard, wing and inverted V-tail to interact in harmony to lift the vehicle efficiently for maximum range while producing a low sonic boom signature.

Figure 10:
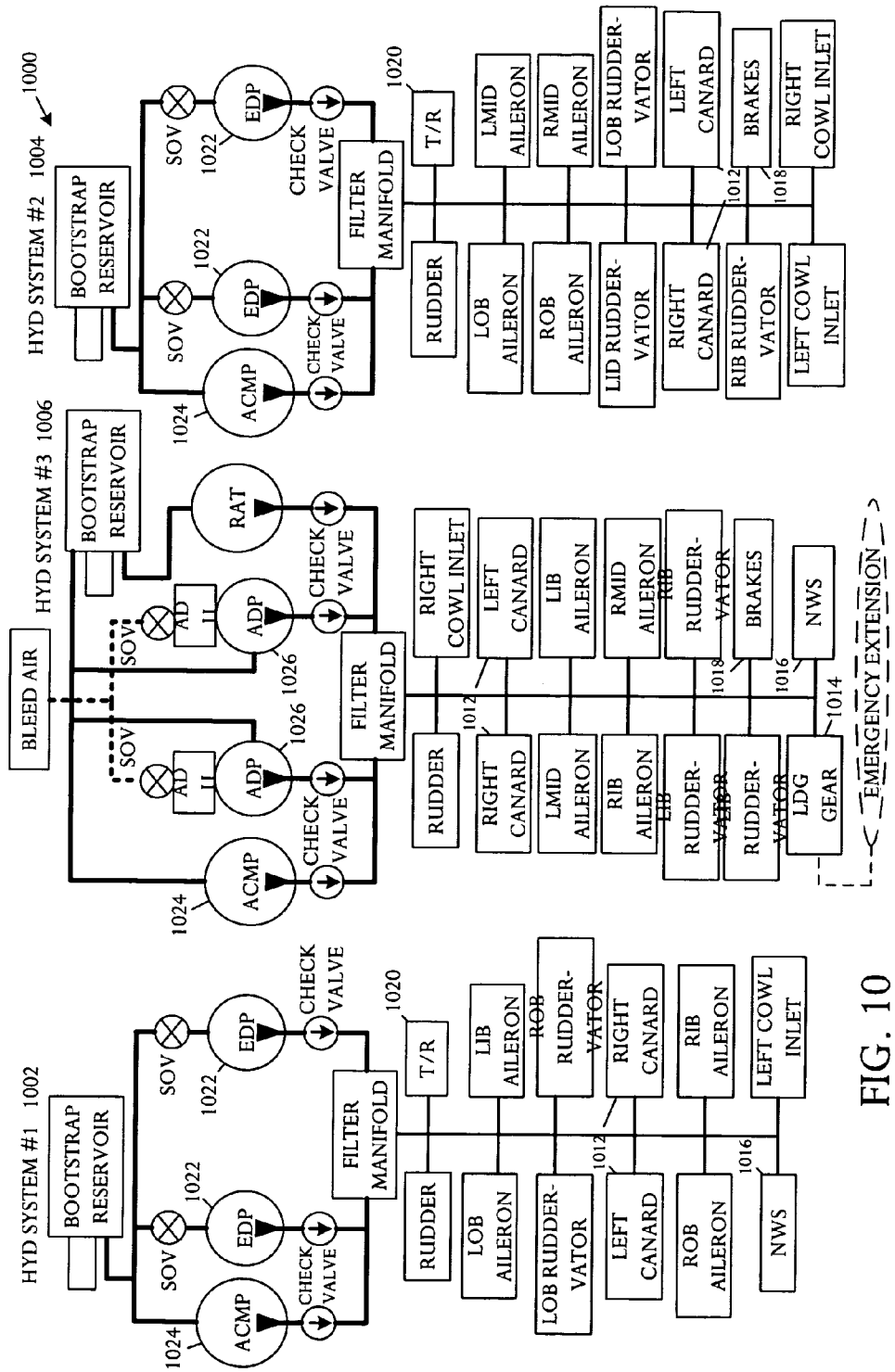
FIG. 10 is a schematic block diagram that depicts an embodiment of a suitable hydraulic power and distribution system architecture for supplying actuating power to the control effectors and systems.

Referring to FIG. 10, a schematic block diagram shows an embodiment of a suitable hydraulic power and distribution system architecture 1000 for supplying actuating power to the effectors and systems. For high reliability, the system 1000 is highly redundant with a hydraulic system supplying three independent sources 1002, 1004, 1006 of hydraulic power to operate primary flight controls, landing gear 1014, nose wheel steering 1016, wheel brakes 1018, and thrust reversers 1020. The three independent systems 1002, 1004, and 1006 give triple redundancy for continued safe flight and landing.

Hydraulic power for the systems is supplied by two engine driven pumps 1022 and an AC motor pump 1024 on system 1 1002 and system 2 1004. The engine driven pumps 1022 can operate continuously while the AC motor pumps 1024 operate on demand basis. Additionally, the AC motor pumps 1024 are an extra source of hydraulic power that gives redundancy within each system. The AC motor pumps 1024 can be operated on the ground for system checkout without running the engines or using a hydraulic ground carts.

System 3 1006 has two air driven pumps 1026 and an AC motor pump 1024. One air driven pump 1026 operates continuously while the other air driven pump 1026 and the AC motor pump 1024 operate on a demand basis. The AC motor pump 1024 in system 3 1006 can also be operated on the ground for system checkout without running the engines or using a hydraulic ground cart. System 3 1006 also includes a ram air turbine 1028 for emergency hydraulic and electrical power in the event of dual engine flameout. The ram air turbine 1028 is sized to supply hydraulic and electrical power to essential equipment from the certified altitude to safe landing for level 3 handling quality.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although a particular aircraft geometry and configuration is described, the channel configuration and techniques for controlling the channel can be utilized in aircraft with different geometries. In particular, although the described aircraft has an inverted V-tail configuration, other tail configurations such as T-tail configurations and others may be used. The described propulsion configuration includes two engines mounted at aft positions in a highly swept wing. Other suitable embodiments may have different engine configurations with fewer or more engines, with engines mounted on the fuselage or tail rather than on the wing, or mounted above rather than beneath the wing.

What is claimed is:

1. A supersonic aircraft comprising:
   a fuselage extending forward and aft along a longitudinal axis, the fuselage having a lower surface and an upper surface;
   a highly swept low aspect ratio wing coupled to the fuselage, the wing having a forward leading edge and an aft trailing edge;
   an effector flap coupled to the wing trailing edge;
   a tail empennage coupled to the fuselage aft of the wing on the fuselage upper surface in a position high relative to the wing, the tail empennage forming a channel region subject to complex shock patterns and having an inverted V-tail geometry coupled to the wing in a braced wing configuration further comprising a vertical stabilizer, lateral inverted stabilizers, and inverted V-tail control surface ruddervators; and
   an effector coupled to the tail empennage; and
   a controller coupled to the effector flaps and the effectors, the controller further comprising a control process that reduces drag through channel relief by deflecting both the effector flap down and the effector up, and a control process capable of adjusting the aircraft longitudinal lift distribution for a selected supersonic Mach number to maintain a low sonic-boom, low drag-trim condition.

2. A supersonic aircraft comprising:
a fuselage extending forward and aft along a longitudinal axis, the fuselage having a lower surface and an upper surface;
a highly swept low aspect ratio wing coupled to the fuselage, the wing having a forward leading edge and an aft trailing edge;
an effector flap coupled to the wing trailing edge;
a tail empennage coupled to the fuselage aft of the wing on the fuselage upper surface in a position high relative to the wing, the tail empennage forming a channel region subject to complex shock patterns, and having a supersonic T-tail geometry further comprising a vertical stabilizer, a lateral horizontal stabilizer, and a control surface elevator;
an effector coupled to the tail empennage; and
a controller coupled to the effector flaps and the effectors, the controller further comprising a control process that reduces drag through channel relief by deflecting both the effector flap down and the effector up, and a control process capable of adjusting the aircraft longitudinal lift distribution for a selected supersonic Mach number to maintain a low sonic-boom, low drag-trim condition.

3. A supersonic aircraft comprising:
a fuselage extending forward and aft along a longitudinal axis, the fuselage having a lower surface and an upper surface;
a highly swept low aspect ratio wing coupled to the fuselage, the wing having a forward leading edge and an aft trailng edge;
an effector flap coupled to the wing trailing edge;
engines coupled to the aft portion of the wing lower surface;
a tail empennage coupled to the fuselage aft of the wing on the fuselage upper surface in a position high relative to the wing, the tail empennage forming a channel region subject to complex shock patterns and an inverted V-tail geometry empennage coupled to the wing in a braced wing configuration and carrying lift at the aft portion of the aircraft on a high mounted tail, the length of the aircraft being effectively lengthened for shock waves below the aircraft, thereby further reducing sonic boom, the inverted V-tail carrying tail lift high to maintain a continuous lift distribution and structurally bracing the wing and engines;
an effector coupled to the tail empennage; and
a controller coupled to the effector flaps and the effectors, the controller further comprising a control process that reduces drag through channel relief by deflecting both the effector flap down and the effector up.

4. A supersonic aircraft comprising:
an aircraft body extending forward and aft;
a highly swept low aspect ratio wing coupled to the body, the wing having a forward leading edge and an aft trailing edge;
an effector flap coupled to the trailing edge of the wing;
an inverted V-tail coupled at the aft portion of the aircraft body and coupled to the wing in a braced wing configuration, the inverted V-tail forming a channel region that can generate complex shock patterns;
two wing-mounted engines positioned beneath the wing at an aft location, the braced wing V-tail supporting the engines and enabling trim for a low sonic boom lift distribution;
ruddervator control surfaces coupled to the inverted V-tail; and
a controller coupled to the effector flap and the ruddervator control surfaces, the controller comprising a control process that reduces drag through channel relief by deflecting both the effector flap down and the ruddervator control surfaces up.

5. The aircraft according to claim 4 wherein:
the engines have a highly integrated wing/inlet geometry that enables low-boom compatibility and low inlet/nacelle installation drag.

6. A supersonic aircraft comprising:
an aircraft body extending forward and aft;
a highly swept low aspect ratio wing coupled to the body, the wing having a forward leading edge and an aft trailing edge;
an effector flap coupled to the trailing edge of the wing;
an inverted V-tail coupled at the aft portion of the aircraft body and coupled to the wing in a braced wing configuration, the inverted V-tail forming a channel region that can generate complex shock patterns;
ruddervator control surfaces coupled to the inverted V-tail; and
a controller coupled to the effector flap and the ruddervator control surfaces, the controller comprising a control process that reduces drag through channel relief by deflecting both the effector flap down and the ruddervator control surfaces up, and a control process that adjusts aircraft longitudinal lift distribution for a selected Mach number to maintain a low sonic boom, low drag-trim condition.

7. A channel control system for usage in a supersonic aircraft including a fuselage, wings, a tail empennage, and a plurality of control effectors coupled to the wings and the tail empennage, the empennage and wings forming a channel region that can form complex shock patterns at transonic speeds, the channel control system comprising:
a plurality of actuators coupled to the control effectors, the effectors including a flap coupled to the wing and an effector coupled to the tail empennage; and
at least one vehicle management computer coupled to the plurality of actuators, the at least one vehicle management computer further comprising a process for managing the control effectors in a drag reduction mode through channel relief by deflecting both the flap downward and the tail empennage effector upward, wherein;
the wing is a highly swept low aspect ratio wing coupled to the body, the wing having a forward leading edge and an aft trailing edge, and an effector flap coupled to the trailing edge of the wing;
the tail expennage is in a configuration of an inverted V-tail coupled at the aft portion of the aircraft body and coupled to the wing in a braced wing configuration, the tail empennage comprising ruddervator control surfaces coupled to the inverted V-tail; and
the at least one vehicle management computer further comprises a channel relief process that reduces drag through channel relief by deflecting both the effector flap downward and the ruddervator upward.

* * * * *